United States Patent
Li

(10) Patent No.: US 8,170,050 B2
(45) Date of Patent: May 1, 2012

(54) SELF-ASSIGNMENT OF DETECTORS AND WORKERS AMONG ACCESS DEVICES IN A WIRELESS NETWORK ENVIRONMENT

(75) Inventor: Aihua Edward Li, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 855 days.

(21) Appl. No.: 12/259,960

(22) Filed: Oct. 28, 2008

(65) Prior Publication Data
US 2010/0103842 A1    Apr. 29, 2010

(51) Int. Cl.
*H04J 3/16* (2006.01)
*H04J 3/26* (2006.01)
*H04L 12/413* (2006.01)
(52) U.S. Cl. .................. 370/449; 370/346; 370/432
(58) Field of Classification Search .................. 370/252, 370/254, 277, 282, 312, 338, 346, 432, 449; 709/220–222
See application file for complete search history.

(56) References Cited

U.S. PATENT DOCUMENTS

| | | | | |
|---|---|---|---|---|
| 5,594,731 | A * | 1/1997 | Reissner | 370/338 |
| 7,499,409 | B2 * | 3/2009 | Srikrishna et al. | 370/252 |
| 2006/0089964 | A1 * | 4/2006 | Pandey et al. | 709/203 |
| 2006/0187866 | A1 * | 8/2006 | Werb et al. | 370/311 |
| 2009/0147714 | A1 * | 6/2009 | Jain et al. | 370/311 |

* cited by examiner

*Primary Examiner* — Kwang B Yao
*Assistant Examiner* — Redentor Pasia

(57) ABSTRACT

A self-assignment method for assigning detector and working devices among a plurality of access devices in a wireless network begins by performing wireless data collection with the access devices during an automated calibration period. During this time, each access device receives beacons from one or more other transmitting access devices. The method records radio frequency (RF) data associated with beacons received during the wireless data collection, and thereafter automatically designates at least one of the access devices as a detector device, based upon the recorded RF data.

14 Claims, 11 Drawing Sheets

| F | B | C | H | G | E | D | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 2 sensors (E, G) | 2 sensors (A, C) | 2 sensors (A, B) | 2 sensors (A, D) | 2 sensors (E, F) | 3 sensors (D, F, G) | 4 sensors (A, E, G, H) | 4 sensors (B, C, D, H) |

FIG. 8

| F [worker] | B | C | H | G | E | D | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 2 sensors (E, G) | 2 sensors (A, C) | 2 sensors (A, B) | 2 sensors (A, D) | 1 sensor (E) | 2 sensors (D, G) | 4 sensors (A, E, G, H) | 4 sensors (B, C, D, H) |

FIG. 9

| F [worker] | B [worker] | C | H | G | E | D | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 2 sensors (E, G) | 2 sensors (A, C) | 1 sensor (A) | 2 sensors (A, D) | 1 sensor (E) | 2 sensors (D, G) | 4 sensors (A, E, G, H) | 3 sensors (C, D, H) |

FIG. 10

| F [worker] | B [worker] | C [worker] | H | G | E | D | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 2 sensors (E, G) | 1 sensor (A) | 1 sensor (A) | 2 sensors (A, D) | 1 sensor (E) | 2 sensors (D, G) | 4 sensors (A, E, G, H) | 2 sensors (D, H) |

FIG. 11

| F [worker] | B [worker] | C [worker] | H [worker] | G | E | D | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 2 sensors (E, G) | 1 sensor (A) | 1 sensor (A) | 2 sensors (A, D) | 1 sensor (E) | 2 sensors (D, G) | 3 sensors (A, E, G) | 1 sensor (D) |

FIG. 12

| F [worker] | B [worker] | C [worker] | H [worker] | G [worker] | E | D | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 1 sensor (E) | 1 sensor (A) | 1 sensor (A) | 2 sensors (A, D) | 1 sensor (E) | 1 sensor (D) | 2 sensors (A, E) | 1 sensor (D) |

FIG. 13

| F [worker] | B [worker] | C [worker] | H [worker] | G [worker] | E [detector] | D | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 1 sensor (E) | 1 sensor (A) | 1 sensor (A) | 2 sensors (A, D) | 1 sensor (E) | 1 sensor (D) | 2 sensors (A, E) | 1 sensor (D) |

FIG. 14

| F [worker] | B [worker] | C [worker] | H [worker] | G [worker] | E [detector] | D [unassigned] | A |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 1 sensor (E) | 1 sensor (A) | 1 sensor (A) | 2 sensors (A, D) | 1 sensor (E) | 1 sensor (D) | 2 sensors (A, E) | 1 sensor (D) |

FIG. 15

| F [worker] | B [worker] | C [worker] | H [worker] | G [worker] | E [detector] | D [unassigned] | A [detector] |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 1 sensor (E) | 1 sensor (A) | 1 sensor (A) | 2 sensors (A, D) | 1 sensor (E) | 1 sensor (D) | 2 sensors (A, E) | 1 sensor (D) |

FIG. 16

| F [worker] | B [worker] | C [worker] | H [worker] | G [worker] | E [detector] | D [worker] | A [detector] |
|---|---|---|---|---|---|---|---|
| 2 senders (E, G) | 2 senders (A, C) | 2 senders (A, B) | 2 senders (A, D) | 3 senders (D, E, F) | 3 senders (D, F, G) | 3 senders (A, E, H) | 4 senders (B, C, D, H) |
| 1 sensor (E) | 1 sensor (A) | 1 sensor (A) | 1 sensor (A) | 1 sensor (E) | 0 sensors | 2 sensors (A, E) | 0 sensors |

FIG. 17

SELF-ASSIGNMENT OF DETECTORS AND WORKERS AMONG ACCESS DEVICES IN A WIRELESS NETWORK ENVIRONMENT

TECHNICAL FIELD

Embodiments of the subject matter described herein relate generally to wireless networks. More particularly, embodiments of the subject matter relate to self-configuration techniques for designating wireless access devices within a wireless local area network for operation as detector devices or working devices.

BACKGROUND

Wireless radio frequency (RF) network architectures, wireless local area networks (WLANs), and wireless network devices and accessories are becoming increasingly popular. WLANs can give mobile computing clients the ability to "roam" or physically move from place to place without being connected by wires. In the context of a WLAN, the term "roaming" describes the act of physically moving between wireless access devices, which may be stand-alone wireless access points, wireless access ports that cooperate with one or more wireless switches located in the WLAN, or other suitably configured devices or components. Many deployments of wireless computer infrastructure, such as WLANs, involve the use of multiple wireless switches serving a number of wireless access devices. Wireless networks having a large number of wireless access devices (tens or hundreds) are not uncommon. In such deployments, some of the wireless access devices are utilized as network monitors, sensors, or detectors, that receive wireless signals for purposes of troubleshooting, network diagnostics, security, etc.

Some wireless network administrators utilize software-based tools for purposes of planning, managing, diagnosing, and monitoring WLANs. Planning features in software of this type can generate RF coverage maps in conjunction with the floor plan in which the WLAN will be deployed. Such planning features allow the network administrator to determine how best to provide for RF coverage in the floor plan. However, such planning software relies on RF models for purposes of RF coverage estimations. The use of RF models can be useful to provide a baseline configuration, but RF models may not accurately account for real world operating characteristics and variations caused by the environment. Moreover, even if planning software is utilized, each wireless access device still needs to be manually configured (or designated) for use as either a detector device or a working device. Such manual configuration can be time consuming and costly, especially if the wireless network deployment includes a large number of wireless access devices.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 8-17 are tables that represent an exemplary list of access devices as sorted and manipulated in accordance with an automatic detector assignment process.

DETAILED DESCRIPTION

Figure 1:
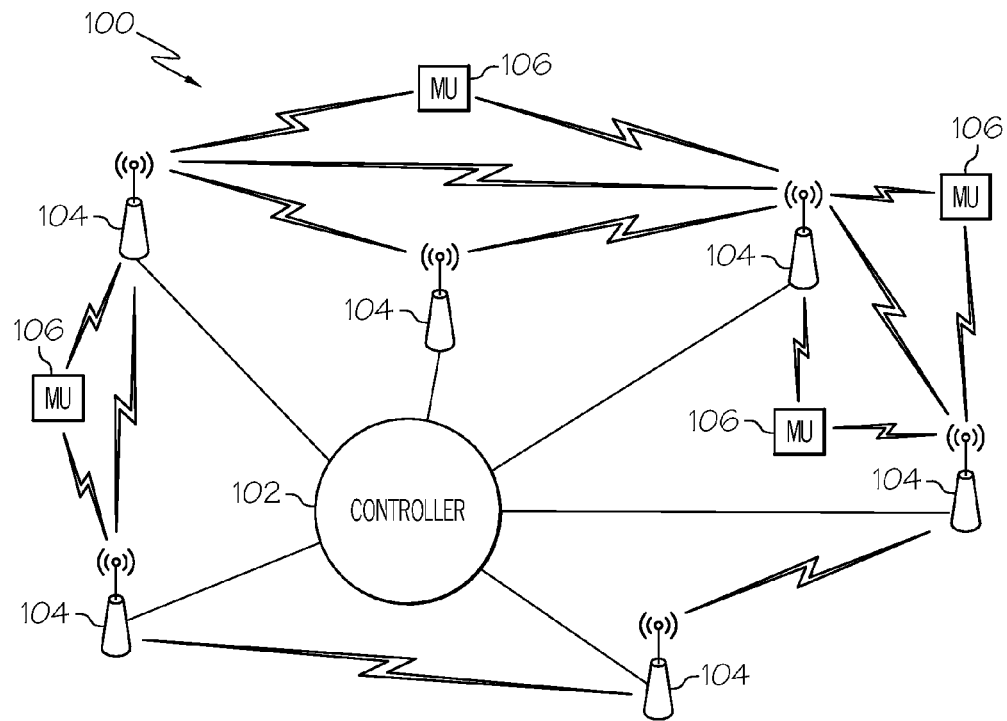
FIG. 1 is a schematic representation of wireless network infrastructure components, including wireless access devices and a controller.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in the figures might depict exemplary arrangements of elements, additional intervening elements, devices, features, or components may be present in an embodiment of the depicted subject matter.

For the sake of brevity, conventional techniques related to WLAN design, topologies, and operation, wireless data communication, wireless network infrastructure components, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

It is not uncommon for a wireless network on a site to have tens to hundreds of wireless access devices. When deploying a wireless network on such a scale, it may be desirable to designate some wireless access devices as "detectors" that function to monitor the health, status, and/or security of the network, and as intrusion protection devices. In contrast, most of the wireless access devices will be designated as "working devices" or "workers" that function in the usual manner to wirelessly receive and transmit data. The detector devices can be used to detect anomalies in the wireless network, e.g., detect the presence of rogue access devices, detect the presence of rogue mobile units, etc. The detector devices can also be used to monitor the health and operating status of the network, e.g., monitor for signs of access device failure so that such failures can be remedied by increasing the power of neighboring access devices.

Traditionally, detectors and workers are assigned as part of the network planning phase. Thereafter, during deployment of the access devices, a network administrator manually configures each access device to operate as either a detector device or a working device. Unfortunately, there are some limitations and problems with this conventional approach. For example, this approach requires manual configuration by human operators. This can be a tedious and time consuming task if the wireless network includes hundreds of wireless access devices. As another example, the assignment of detectors and workers in this manner is static in nature. In other words, this assignment procedure cannot automatically take into consideration the environment change and topological change caused by access device failure. Moreover, if new access devices are added to the network or access devices are removed from the network, a human operator may need to reassign detectors and workers.

The techniques and procedures described herein can be used in lieu of manual assignment procedures that designate whether a wireless access device in a network is a detector or a worker. Indeed, a network administrator can simply initiate the self-assignment procedure, which then automatically collects site measurement data and provides the desired configuration settings in a few seconds. Furthermore, this procedure can be scheduled to run at any desired time to enable ongoing adaptation of the wireless network to changing environmental conditions.

FIG. 1 is a schematic representation of wireless network infrastructure components, which may be deployed in a WLAN 100. This simplified embodiment of WLAN 100 employs a controller 102 and a plurality of wireless access devices 104, each of which is communicatively coupled to controller 102. WLAN 100 can support wireless clients or MUs 106 using wireless access devices 104. WLAN 100 may also include or communicate with any number of additional network components, such as a traditional local area network ("LAN"). Depending upon the deployment, WLAN 100 may have any number of wireless switches (including zero), each supporting any number of wireless access devices, and each wireless access device supporting any number of MUs 106. Indeed, the topology and configuration of WLAN 100 can vary to suit the needs of the particular application and FIG. 1 is not intended to be limiting in any way.

As used here, a wireless access device 104 could be realized as a wireless access port, which is a "thin" device that relies on the network intelligence and management functions provided by controller 102 and/or at least one wireless switch (not shown). Alternatively, a wireless access device 104 could be realized as a wireless access point, which is a "thick" device having some network intelligence and processing power integrated therein. Wireless access devices 104 preferably support a number of conventional wireless data communication operations, and conventional wireless access devices are available from Motorola, Inc. and other suppliers. Briefly, each wireless access device 104 is capable of receiving data from MUs 106 and from other wireless access devices 104 over wireless links (the wireless links are represented by the lightning bolts in FIG. 1). Once the data is captured by a wireless access device 104, the data can be processed for communication within WLAN 100. For example, the data can be encapsulated into a packet format compliant with a suitable data communication protocol. In certain embodiments, data can be routed within WLAN 100 using conventional Ethernet 802.3 formatting (including standard Ethernet destination and source packet addresses). As described in further detail below, a wireless access device 104 may be assigned and designated for operation as either a detector device or a working device (i.e., an access device that functions in the usual and normal manner to associate with MUs 106 and to transmit and receive data within WLAN 100).

Controller 102 could be implemented in a wireless switch, in a wireless access device 104, or in any suitable component in WLAN 100. The illustrated embodiment of controller 102 is communicatively coupled to each wireless access device 104 via a bidirectional data communication link. In alternate embodiments, controller 102 can be coupled to one or more wireless access devices 104 indirectly, e.g., a first wireless access device could relay data from a second wireless access device to controller 102. Depending upon the particular implementation, controller 102 communicates with a wireless access device 104 using wireless data transport techniques and/or using a wired connection. Moreover, controller 102 may be coupled to an Ethernet switch (not shown), which is in turn coupled to wireless access devices 104. This arrangement would allow controller 102 to communicate with wireless access devices 104 via the Ethernet switch.

Figure 2:
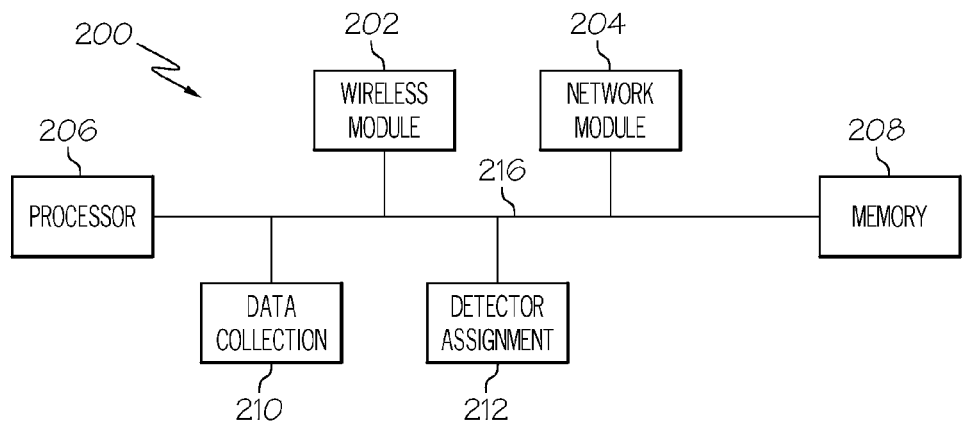
FIG. 2 is a schematic representation of an embodiment of a controller suitable for use in a wireless network.

Controller 102 is suitably configured to carry out a number of centralized operations, processes, and protocols associated with the automated configuration and setup of wireless access devices 104 (as described in more detail below). In this regard, FIG. 2 is a schematic representation of an embodiment of a controller 200 suitable for use in a wireless network such as WLAN 100 (indeed, controller 102 may be configured in accordance with the following description of controller 200). The depicted embodiment of controller 200 includes, without limitation: a wireless module 202; a network module 204; a processor 206; an appropriate amount of memory implemented in at least one memory element 208; and functional modules associated with wireless data collection 210, detector assignment 212, and possibly other features. These elements and modules may be interconnected using a data/control bus 216 or any suitably configured interconnection architecture or arrangement.

Wireless module 202 represents the hardware, software, and/or firmware that is responsible for handling wireless data communication for controller 102, assuming that controller 102 supports wireless communication. Thus, wireless module 202 preferably includes an RF radio, RF front end components, interface components, and at least one antenna that supports wireless data communication. Although not required in all embodiments, wireless module 202 is preferably configured to support common wireless protocols, such as 802.11 (any variation thereof).

Network module 204 represents the hardware, software, and/or firmware that is responsible for handing network (non-wireless) data communication for controller 102. In practice, network module 204 may include wire or cable interface ports, plugs, or connectors, and associated logic. As mentioned previously, network module 204 may be suitably configured to support Ethernet data communication for controller 102.

Processor 206 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Processor 206 may be realized as a microprocessor, a controller, a microcontroller, or a state machine. Moreover, processor 206 may be implemented as a combination of computing devices, e.g., a combination of a digital signal processor and a microprocessor, a plurality of microprocessors, one or more microprocessors in conjunction with a digital signal processor core, or any other such configuration.

Memory element 208 may be volatile (such as RAM), non-volatile (such as flash memory, etc.) or a combination thereof. In this regard, memory element 208 can be coupled to processor 206 such that processor 206 can read information from, and write information to, memory element 208. In the alternative, memory element 208 may be integral to processor 206. As an example, processor 206 and memory element 208 may reside in an ASIC. Memory element 208 supports the self-assignment techniques described herein by storing and recording data that is collected in response to diagnostic operation of the wireless access devices.

FIG. 2 depicts functional modules that represent processing logic and/or programmed methodologies utilized for data collection 210 and detector assignment 212. In practice, this functionality can be implemented in or performed by processor 206. FIG. 2 shows these functional blocks as distinct operating modules for ease of description. These operations are described in more detail below with reference to FIGS. 4-6.

It should be appreciated that each wireless access device 104 may be configured in a manner similar to that described above for controller 200. In particular, a wireless access device 104 may include components and elements that are equivalent to: wireless module 202; network module 204; processor 206; and memory element 208. Moreover, a wireless access device 104 that is compatible with the self-configuration technique will include equivalent processing modules to support detector/working assignment in response to commands issued by controller 102.

The 802.11 Specification identifies particular signal sensitivities corresponding to different desired bit rates. For example, for a bit rate of 1 Mbps, the signal sensitivity should be −80 dBm, for a bit rate of 11 Mbps, the signal sensitivity should be −76 dBm, and for a bit rate of 54 Mbps, the signal sensitivity should be −65 dBm. The specified signal sensitivities are applied as follows. Any given 802.11 compliant mobile unit should be able to sustain a particular bit rate given the corresponding signal sensitivity (or strength). For example, a given mobile unit should sustain 11 Mbps when the supplied signal strength is −76 dBm. Of course, it is possible for a mobile unit to achieve a better bit rate than that specified by the 802.11 standard. During network planning, the site planner usually has a desired throughput number in the middle range of the available 802.11 bit rates. This throughput number is referred to herein as the "coverage rate." For example, if the coverage rate is 11 Mbps, then the network administrator will configure the wireless network to support 11 Mbps.

In practice, chip manufacturers typically can achieve better sensitivity than that required by IEEE 802.11 specifications. Chip manufacturing techniques normally provide equipment manufacturers the ability to adjust the sensitivity level by programming the sensitivity register. In other words, that access device can receive wireless signals transmitted by three to ten neighboring access devices. Accordingly, only a limited number of wireless access devices need be designated for use as detectors while still meeting the specified coverage rate.

A WLAN of the type described herein supports an automated self-configuration (also referred to here as self-assignment) technique for the wireless access devices. This self-assignment technique automatically determines detector and working assignments for the wireless access devices in the WLAN, based upon empirical RF-based data that is collected by the wireless access devices themselves. The RF operating data is collected and processed by the controller after the wireless access devices have been physically located, positioned, installed, and otherwise prepared for RF operation. Thereafter, each access device is assigned as either a detector device or a working device in response to empirical data that is derived from wireless test signals communicated between the wireless access devices. This procedure allows a network administrator to assign detectors in the WLAN after the equipment is installed, and in an ongoing manner (e.g., to compensate for the addition, removal, or failure of access devices) if needed.

Figure 3:
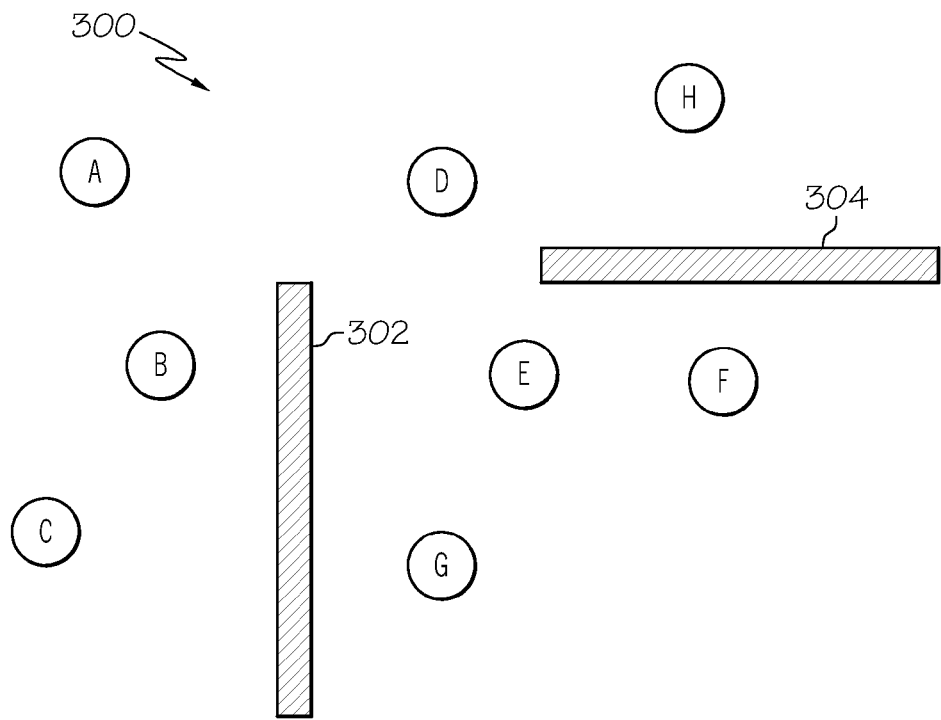
FIG. 3 is a schematic representation of wireless access devices in an exemplary wireless network environment.

FIG. 3 is a schematic representation of wireless access devices in an exemplary wireless network environment 300. In practice, a wireless network could include many more (e.g., hundreds) of wireless access devices—FIG. 3 shows eight access devices for the sake of simplicity. In FIG. 3, the eight access devices are labeled with capital letters A-H. Wireless network environment 300 is depicted as a floor plan layout, i.e., viewed from the top down. This example includes two walls 302, 304 (or other obstructions) that generally divide the space into different sections. This exemplary layout will be referred to below during the description of the self-assignment procedure.

Figure 4:
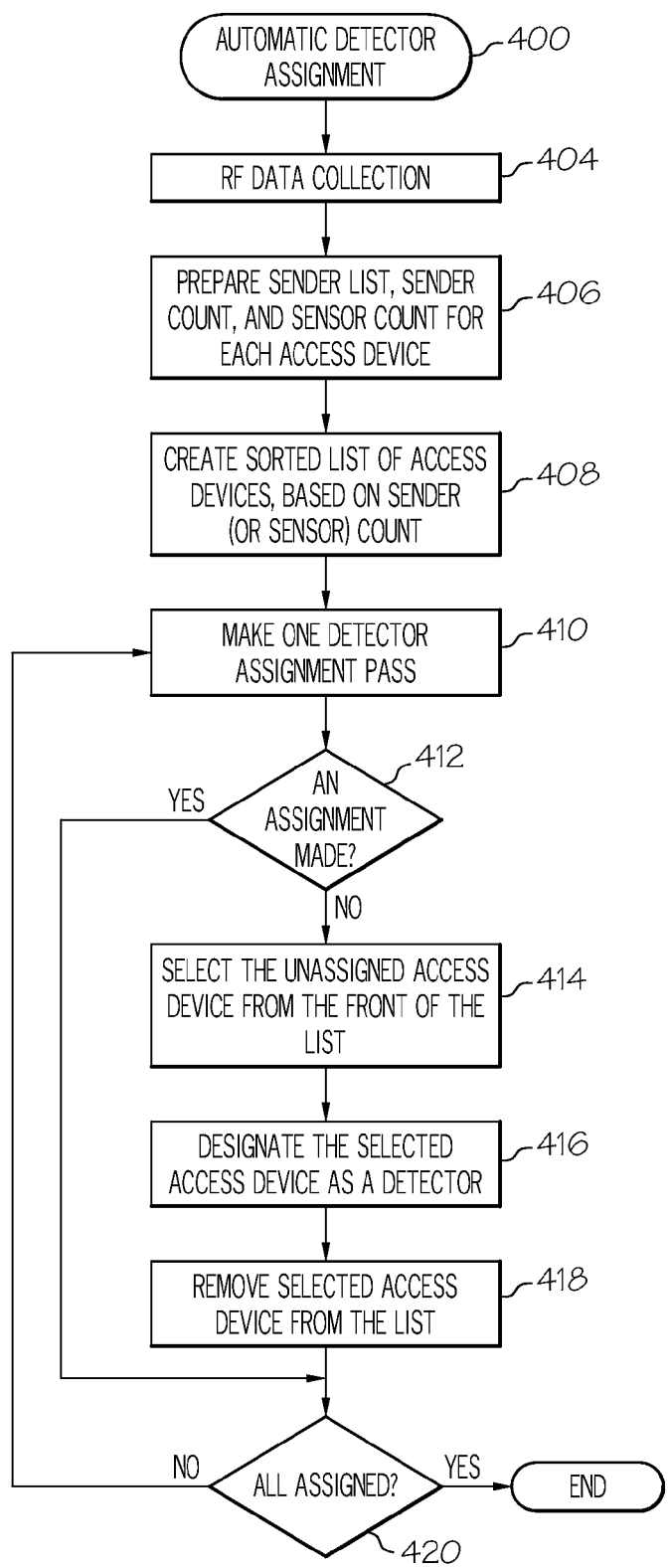
FIG. 4 is a flow diagram that illustrates an embodiment of an automatic detector assignment process for wireless access devices.
Figure 5:
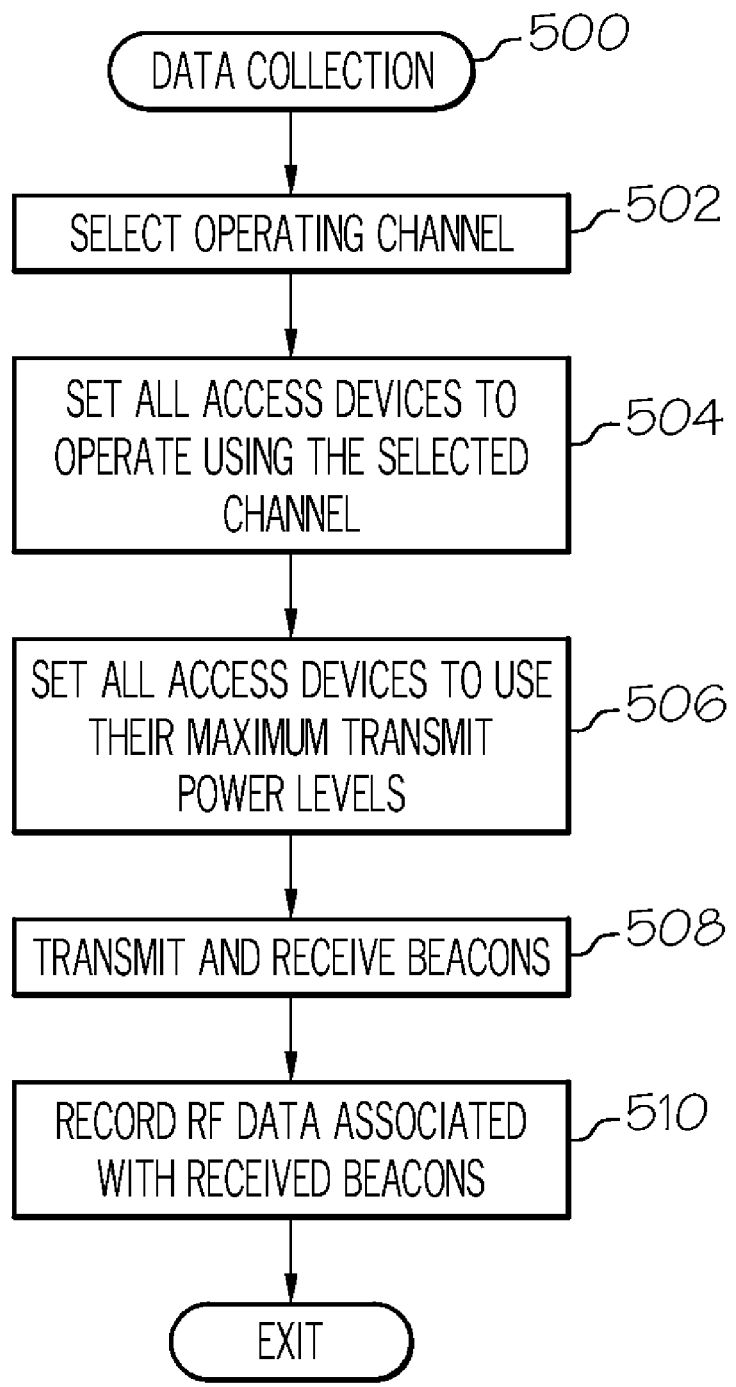
FIG. 5 is a flow diagram that illustrates an embodiment of a wireless data collection process, which may be utilized during the automatic detector assignment process.
Figure 6A:
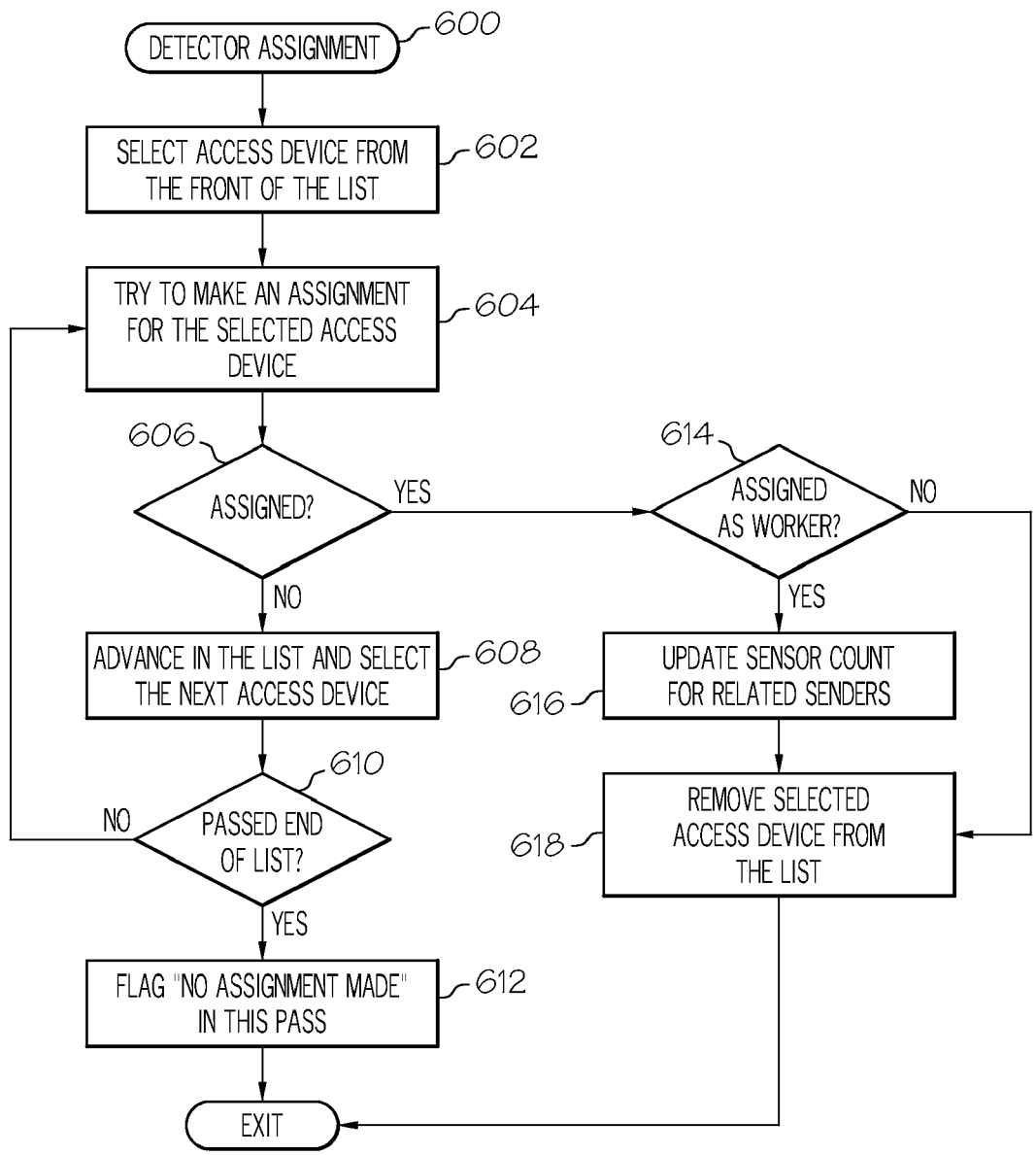
FIG. 6A is a flow diagram that illustrates an embodiment of a detector assignment process, which may be utilized during the automatic detector assignment process.
Figure 6B:
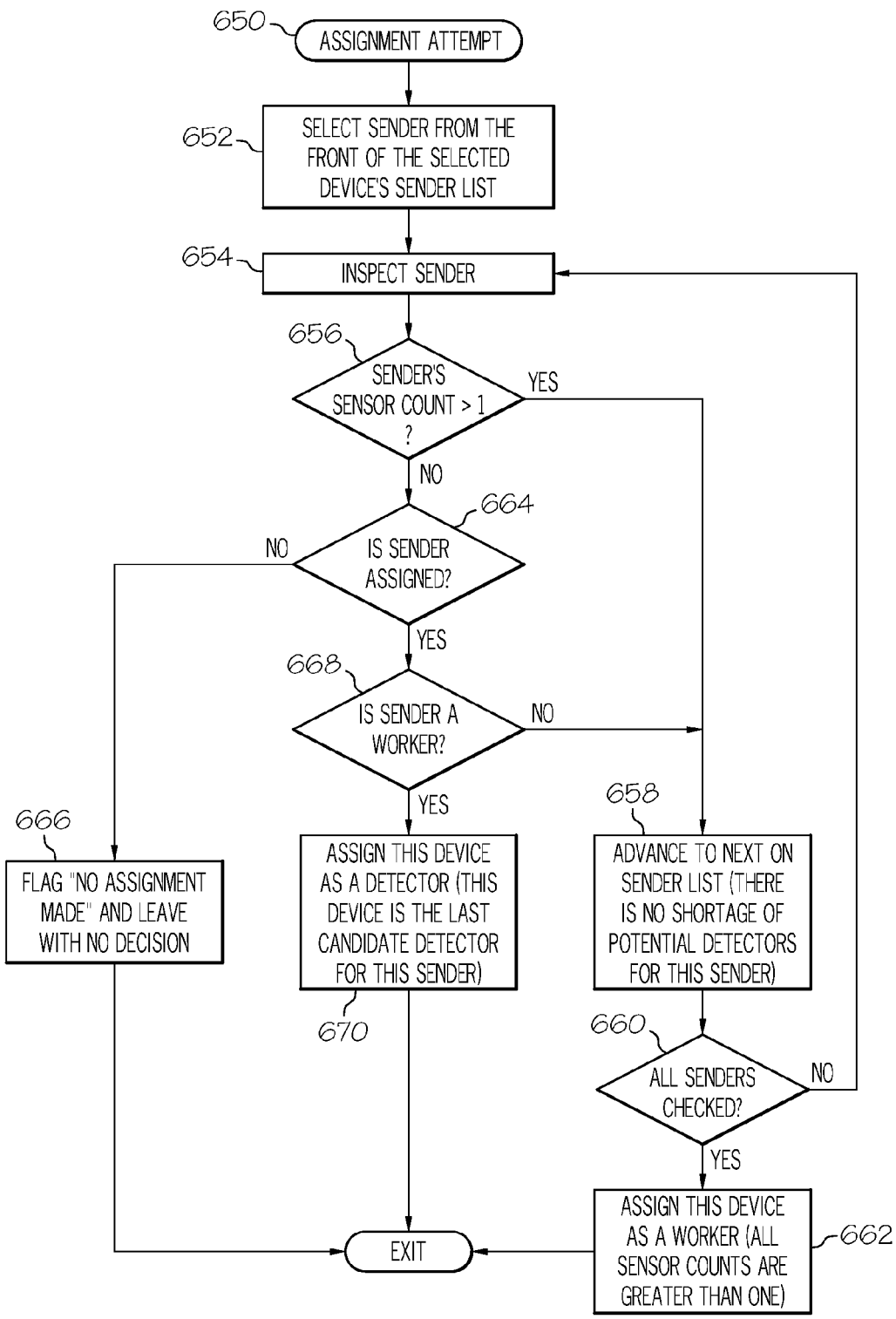
FIG. 6B is a flow diagram that illustrates an embodiment of an assignment attempt process, which may be utilized during the detector assignment process.

FIG. 4 is a flow diagram that illustrates an embodiment of an automatic detector assignment process 400 for wireless access devices. FIG. 5 is a flow diagram that illustrates an embodiment of a wireless data collection process 500, which may be utilized in process 400. FIG. 6A is a flow diagram that illustrates an embodiment of a detector assignment process 600, which may be utilized in process 400. FIG. 6B is a flow diagram that illustrates an embodiment of an assignment attempt process, which may be utilized in process 600. The various tasks performed in connection with any of these processes may be performed by software, hardware, firmware, or any combination thereof. For illustrative purposes, the following description of these processes may refer to elements mentioned above in connection with FIGS. 1-3. In practice, portions of a given process may be performed by different elements of the described system, e.g., a wireless access device, a central controller, a wireless switch, or the like. It should be appreciated that a process shown and described here may include any number of additional or alternative tasks, the tasks shown in the figures need not be performed in the illustrated order, and a process may be incorporated into a more comprehensive procedure or process having additional functionality not described in detail herein.

One desired goal of automatic detector assignment process 400 is to quickly and efficiently assign detectors in the wireless network in a manner that satisfies the following guidelines. First, each working access device in the network should be monitored by at least one detector. If this rule is not satisfied, then failure of an access device might go undetected. Second, it is desirable to minimize the number of access devices that are assigned as detectors within the network. With large scale deployments that include many access devices, a brute force approach is unrealistic and inefficient due to the extremely high number of possible combinations that must be considered. Accordingly, process 400 employs certain heuristics to intelligently satisfy at least the general rules mentioned above in a quick and practical manner. Process 400 employs an iterative elimination technique that effectively selects the detectors by eliminating access devices from consideration. In this regard, process 400 considers redundant monitoring (coverage) conditions and eliminates a candidate access device from consideration as a detector if other access devices might be able to perform the detector function for the working access devices.

Referring to FIG. 4, automatic detector assignment process 400 can be performed at any time after the wireless access devices have been located, installed, and are otherwise prepared for operation. As mentioned previously, the preferred deployment utilizes at least one central controller to carry out at least some of process 400. Accordingly, the controller will also be installed and set up as needed to support process 400.

This embodiment of process 400 begins by performing RF data collection (task 404) for the wireless network. This data is referred to as "RF data" because the data is indicative of certain RF characteristics, properties, or criteria corresponding to the wireless access devices in the network. Wireless data collection is preferably performed during an automated calibration period where the access devices automatically perform the RF functions needed to obtain the desired RF data. In certain embodiments, the controller commands the access devices to transmit their respective test beacons during task 404. FIG. 5 depicts an exemplary data collection process 500, which may be performed during task 404. Process 500 may begin by selecting an operating channel for the access devices (task 502). As is understood by those skilled in the art, a wireless access device will usually be restricted to a certain limited list of available operating channels, and that list can be region-specific. Moreover, even though a variety of channels may be available, network administrators usually narrow the list such that it only includes channels having non-overlapping frequency ranges (in an attempt to avoid or reduce interference). Regarding task 502, the particular operating channel can be arbitrarily selected, for reasons that will become apparent later.

In accordance with the preferred embodiment of process 500, all of the access devices are controlled, commanded, or otherwise set to operate using the selected channel (task 504). In addition, all of the access devices are controlled, commanded, or otherwise set to use their maximum allowed transmit power levels (task 506) for the selected channel. In practice, all of the access devices might have the same maximum transmit power level. Alternatively, any number of different maximum transmit power levels can be utilized throughout the wireless network. The maximum transmit power level for an access device may depend on a number of factors, such as: the operating channel or channels; the geographic region of deployment; the particular design of the access device; user preferences; or the like (the maximum transmit power level for an access device is typically within the range of about 15-25 dBm). In certain embodiments, the maximum transmit power level for each access device is predetermined or known a priori by the controller. Thus, the controller can store the maximum transmit power levels in a suitably formatted table or data structure (e.g., in memory element 208 shown in FIG. 2), and this table can be accessed by the controller during task 506. In this regard, the controller can retrieve the maximum transmit power level for each access device, generate a suitably formatted command or instruction, and send the commands or instructions to the access devices. Upon receipt of those commands/instructions, the access devices adjust their transmit power levels in an appropriate manner.

Next, the wireless access devices transmit and receive wireless calibration signals for a designated period of time, using the wireless channel selected in task 502. All of the access devices will be transmitting/receiving the wireless signals on the same channel, and at their respective maximum transmit power levels. In preferred embodiments, the access devices transmit and receive beacons (task 508) to and from each other in a non-synchronized manner. In accordance with established techniques and technologies, wireless network beacons are typically sent once every 100 milliseconds (i.e., ten beacons per second), and a beacon transmission lasts for less than one millisecond. Accordingly, the probability of beacon collision during task 508 is relatively low, even if several access devices are transmitting beacons concurrently. Moreover, even if beacon collisions occur, the access devices can utilize conventional back-off techniques to resolve the collisions. The duration of task 508 is chosen to ensure that all of the access devices have enough time to successfully exchange beacons, and that each access device successfully receives enough beacons from all other access devices that are within operating range. For example, the duration of task 508 may be between one and ten seconds, although different time periods can be used.

During the transmit/receive time period, or at any time thereafter, the controller records and saves the RF data that is associated with the received beacons (task 510). Some or all of the following information associated with a received beacon could be saved during task 510: an identifier of the transmitting access device; a quantity related to the received signal strength or power level; and the transmit power level (also referred to herein as the beacon transmit power level). The identifier uniquely identifies the transmitting access device within the wireless network. Moreover, the identifier will indicate whether or not the transmitting access device is a legitimate member of the wireless network or an external access device. Thus, if the controller does not recognize the identifier as one belonging to the wireless network, it can flag the transmitting access device as an external device (and disregard signals received from external devices). In preferred embodiments the identifier is the MAC address of the transmitting access device. Alternatively, the identifier may be an IP address, a serial number, a user-assigned tag, or the like.

In preferred embodiments, data collection process 500 collects data only for the maximum transmit power levels of the access devices. If desired, process 500 could be repeated or modified to collect RF data associated with lower transmit power levels. In addition, process 500 could be repeated or modified to collect RF data using other operating channels.

The collected RF data can be processed during data collection process 500 or at any time thereafter. More specifically, the controller will determine the extent of wireless communication between the access devices in the network. More particularly, for a given access device (e.g., $AD_A$), the controller will determine which (if any) other access devices transmitted beacons that were received by $AD_A$. In addition, the controller will determine which (if any) other access devices received beacons that were transmitted by $AD_A$. The following description uses the terms "sender" and "sensor" as labels or descriptors of wireless access devices, and these terms indicate whether a given access device can transmit or receive signals to another access device. As used herein, if $AD_A$ can receive wireless signals from $AD_B$, then $AD_B$ is a "sender" for $AD_A$. On the other hand, if $AD_B$ can receive wireless signals from $AD_A$, then $AD_B$ is a "sensor" of $AD_A$. Thus, a given access device can have any number (including zero) of sender access devices and any number (including zero) of sensor access devices within the network. In typical WLAN deployments, a pair of access devices will be senders and sensors relative to each other because usually they will both be within transmit and receive range of each other. However, such a reciprocal sender/sensor relationship may not always be established between two access devices, for various reasons, such as the sensitivity difference due to hardware components inside the pair of access devices.

Figure 7:
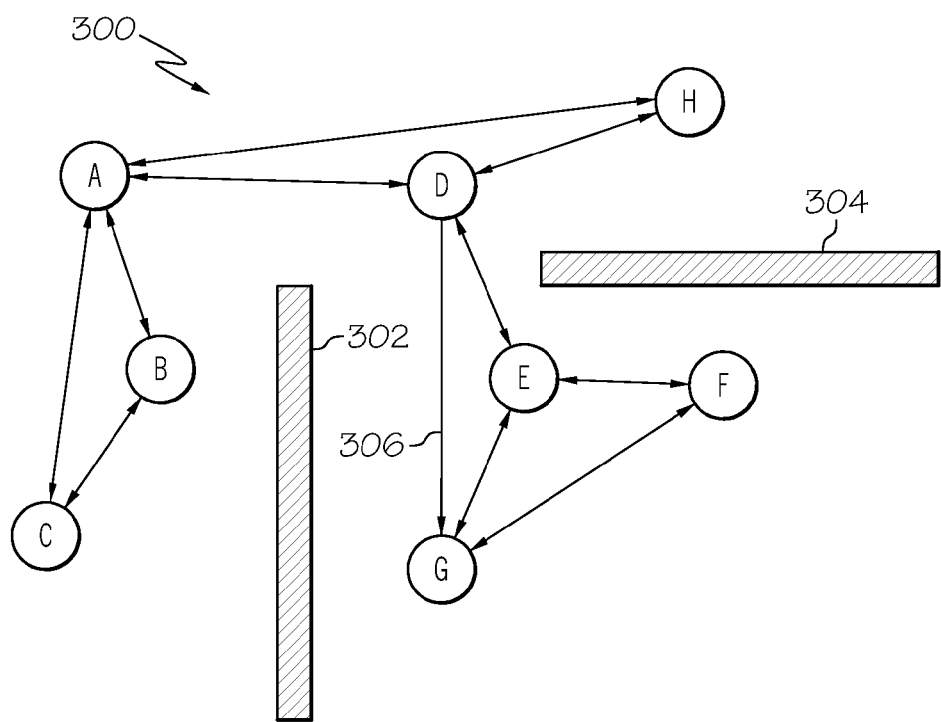
FIG. 7 is a schematic representation of wireless access devices in an exemplary wireless network environment.

FIG. 7 is another schematic representation of the wireless access devices shown in FIG. 3. FIG. 7 graphically depicts the sender/sensor relationships between the eight access devices. In this regard, an arrowhead pointing to an access device represents a received signal (beacon) at that access device. Thus, an arrow pointing from a transmitting access device to a receiving access device indicates that the transmitting access device is a sender for the receiving access device, and that the receiving access device is a sensor of the transmitting access device. For example, the arrow 306 in FIG. 7 indicates that $AD_G$ can "hear" or receive signals from $AD_D$. However, in the reverse direction, $AD_D$ does not detect or receive signals from $AD_G$. A double headed arrow indicates that the two access devices are mutual senders/sensors relative to each other (i.e., they can both transmit and receive wireless signals to and from each other).

For the scenario depicted in FIG. 7, the access device $AD_A$ has four senders ($AD_B$, $AD_C$, $AD_D$, and $AD_H$) and four sensors ($AD_B$, $AD_C$, $AD_D$, and $AD_H$). The access device $AD_B$, however, has only two senders ($AD_A$ and $AD_C$) and only two sensors ($AD_A$ and $AD_C$). Notably, the access device $AD_D$ has three senders ($AD_A$, $AD_E$, and $AD_H$) and a different number—four—of sensors ($AD_A$, $AD_E$, $AD_G$, and $AD_H$). Similarly, the access device $AD_G$ has three senders ($AD_D$, $AD_E$, and $AD_F$) and a different number—two—of sensors ($AD_E$ and $AD_F$).

Referring again to FIG. 4, after completion of RF data collection (task 404), this embodiment of automatic detector assignment process 400 prepares a sender list, a sender count, and a sensor count for each access device (task 406). In addition, process 400 analyzes and arranges the RF data in an appropriate manner to create a sorted list, map, or table of the access devices (task 408). The list is preferably sorted based on the sender count of the access devices (alternatively, the list can be sorted based on the sensor count of the access devices, with equivalent results). More specifically, the list is sorted in accordance with increasing sender count such that access devices having fewer senders appear earlier in the list relative to other access devices. Sorting the list in this manner is desirable to ensure that process 400 will eventually converge with all access devices assigned as either a detector device or a working device. FIG. 8 is a table that represents one format of a sorted list corresponding to the example scenario depicted in FIG. 7. Each column in FIG. 8 corresponds to one of the eight access devices, and each column includes the sender count and the sensor count for that particular access device. This table also identifies which of the other access devices are senders, and which are sensors, for the access device identified at the top of the column. FIG. 8 represents the initial state and sorting of the RF data. As explained above, the access devices are sorted by increasing sender count. For this example, $AD_F$, $AD_B$, $AD_C$, and $AD_H$ each have two senders and two sensors, therefore, the sort order of these four access devices relative to each other is arbitrary. In certain embodiments, however, a "tiebreaker" rule can be implemented in such a situation, whereby the sensor count is considered (e.g., lower sensor count appears earlier in the list). In accordance with the designated sort order, $AD_A$ appears last in the list because it has four senders.

After task 408 creates the sorted list of access devices, process 400 can proceed to make a detector assignment pass (task 410). During task 410, access devices are analyzed in an ordered manner for purposes of detector assignment. More specifically, for each candidate access device under analysis, process 400 will designate that candidate access device as a detector device or a working device (if possible). As explained in more detail below, there might be situations where task 410 will leave the candidate access device unassigned; an undecided access device can be reevaluated later during a subsequent iteration of process 400.

After the analysis of a candidate access device, process 400 might check whether at least one assignment was made (query task 412) during the last iteration of task 410. If one or more access devices were assigned as a detector or as a worker during task 410, then process 400 proceeds to a query task 420 (described below). If, however, no assignment was made during the last execution of task 410, then process 400 can take "corrective" action as needed. Although corrective action would rarely be necessary in a practical deployment, process 400 considers the case when an iteration of task 410 does not result in any assignment. This scenario will occur when every access device in the working list has a sender with a sensor count of one, and when that sensor is not yet assigned. In other words, this scenario arises when there is circular "dependency" among the access devices in the list. With such circular dependency, one solution is to select an unassigned access device from the list (task 414) and designate the selected access device as a detector (task 416). In other words, a forced detector assignment is made to break the circular dependency. In preferred embodiments, the unassigned access device selected in task 414 will be the unassigned access device at the front of the list.

After making the assignment in task 416, process 400 removes the selected access device from the list of unassigned access devices (task 418). Notably, since task 416 makes a detector assignment rather than a worker assignment, the sensor count for the detector's senders remains the same for reasons that will become apparent later in this detailed description. Thereafter, process 400 checks whether all of the access devices have been assigned (query task 420). If so, then process 400 ends. If not, then process 400 returns to task 410 to make another detector assignment pass in an attempt to make another assignment on the remaining unassigned access devices. Referring again to query task 412, if task 410 makes an assignment, i.e., the candidate access device is designated to be a detector or a worker, then process 400 will also proceed to query task 420 to check whether all of the access devices have been assigned. Thus, task 410 and/or task 416 will be performed as many times as the devices to be assigned, since either task 410 or task 416 is performed once for each unassigned access device.

As described briefly above, task 410 preferably results in one of three outcomes for each unassigned analyzed access device: (1) the access device is assigned as a detector device;

(2) the access device is assigned as a working device; or (3) the access device is left unassigned. In this regard, FIG. 6A is a flow diagram that illustrates an embodiment of a detector assignment process 600, which may be utilized during process 400, namely, during task 410. Process 600 begins by selecting the next unassigned access device from the front of the sorted list (task 602). Process 600 attempts to make an assignment for the selected access device (task 604). More specifically, task 604 tries to designate the selected access devices as either a detector device or a working device. If task 604 does not make an assignment (query task 606), then process 600 will advance in the list and select the next access device in the list (task 608). If the end of the list has been passed (query task 610), then process 600 will flag or indicate that no assignment was made in this detector assignment pass (task 612). If, however, the end of the list has not been passed, then process 600 can return to task 604 to attempt an assignment on the just-selected access device.

Referring again to query task 606, if the last iteration of task 604 makes an assignment, then process 600 checks whether the selected access device was assigned as a worker (query task 614). If so, then process 600 updates (decrements) the respective sensor count of all senders of the selected access device (task 616). In preferred embodiments, the sensor count is decremented by one because the candidate access device will no longer be available for use as a sensor for those senders. Process 600 also removes the just-assigned access device from the working list of unassigned access devices (task 618).

If query task 614 determines that the candidate access device was assigned as a detector rather than a worker, then task 616 is skipped and task 618 is performed to remove the candidate access device from the list. Thus, process 600 is executed to make one pass through the list of access devices, attempting to make an assignment to an access device as soon as possible, as either a detector, a worker, or "unassigned." Upon completion, process 600 exits such that query task 412 (FIG. 4) can be performed.

FIG. 6B is a flow diagram that illustrates an embodiment of an assignment attempt process 650, which may be utilized during task 604 of detector assignment process 600. Process 650 represents the determination or decision routine that is performed for each selected access device, and one or more iterations of process 650 can be performed during task 604. This embodiment of process 650 begins by selecting the sender device from the front of the selected device's sender list (task 652). Process 650 can then proceed to inspect or analyze the selected sender device (task 654) in accordance with the following routine.

Although the order of analysis is not important, this embodiment of process 650 initially checks whether the sensor count for the selected sender is greater than one (query task 656). If so, then process 650 can advance to the next device on the selected device's sender list (task 658). Task 658 is performed because the sensor count (which is greater than one) indicates that there is no shortage of potential detectors for this particular sender. In other words, this particular sender device has more than one possible access device (i.e., sensors) that might be suitable for use as its detector. Accordingly, detector coverage for this sender is redundant at this time, and the unassigned candidate access device can therefore be eliminated as a potential detector for this sender.

If process 650 determines that all of the senders in the sender list have already been checked (query task 660), then the candidate access device under consideration is assigned as a worker device (task 662). Process 650 makes this worker assignment at this time because each sender for the candidate access device has more than one possible sensor device that might be suitable for use as its detector. Accordingly, detector coverage for all of the senders is redundant at this time, and the candidate access device can be completely eliminated as a potential detector.

On the other hand, if query task 660 determines that all of the senders in the sender list have not been checked, then process 650 returns to task 654 so that the newly selected sender device can be analyzed as described here. Of course, if any sender device has a sensor count that is equal to one (query task 656), then process 650 need not perform task 658. Although the actual order of analysis is not important, this embodiment of process 650 checks whether the selected sender device has already been assigned as either a detector or a worker (query task 664). If not, then process 650 will flag or indicate that no assignment will be made for the candidate access device (task 666). In other words, process 650 will leave the candidate access device unassigned and will exit without making a decision on that candidate access device.

If query task 664 determines that the selected sender device is already assigned, then process 650 can check if the selected sender device is assigned as a working device (query task 668). If so, then process 650 assigns detector status to the candidate access device (task 670). This detector assignment is made because the just-analyzed sender device (which has a sensor count of one or less) must rely on the candidate access device to act as a detector. Otherwise, if the candidate access device were designated as a worker, then there would be no other candidate access device (i.e., sensor) available to serve as a detector for the just-analyzed sender device.

If query task 668 determines that the selected sender device is not assigned as a worker (i.e., it is assigned as a detector), then process 650 can proceed to task 658, which was described previously. In this regard, process 650 can disregard or ignore this particular sender device for this decision on the candidate access device because this sender device is already designated to be a detector. In other words, this particular sender device is treated as a "don't care" condition, and task 658 can advance to the next entry in the candidate access device's sender list.

Process 650 is performed as described above for each candidate access device. Consequently, at the completion of process 650, each candidate access device under consideration will be assigned as a detector, assigned as a worker, or left unassigned/undecided. Accordingly, process 650 exits after making the assignment attempt for the candidate access device. As described above, process 650 exits such that query task 606 (FIG. 6A) can be executed.

A simple example will now be described with reference to FIGS. 8-17, which are tables that represents an exemplary list of access devices sorted and manipulated in accordance with an automatic detector assignment process such as process 400. FIG. 8 represents the initial sorted list of unassigned access devices depicted in FIG. 7, along with the senders, sender counts, sensors, and sensor counts for each unassigned access device. Here, the access device $AD_F$ represents the first unassigned access device under analysis. For this example, $AD_F$ has two senders: $AD_E$ and $AD_G$. $AD_E$ has a sensor count of three, while $AD_G$ has a sensor count of two. Thus, process 650 (FIG. 6B) would perform task 662 for this scenario, and $AD_F$ would be assigned as a working device. Moreover, the sensor count of $AD_E$ would be decremented from three to two, and the sensor count of $AD_G$ would be decremented from two to one. FIG. 9 is a table that represents the updated list of access devices and sensor counts that result after the assignment of $AD_F$ as a working device. The shading of the $AD_F$ column indicates that it has been assigned and, therefore, removed from the list of unassigned access devices. For ease of illustration, the labels of the sensor access devices (shown in parentheses) are updated to reflect a reduced sensor count. A practical implementation, however, need not keep track of the sensor access device identities in this manner; the system need only keep track of the sensor counts for the various access devices.

The access device $AD_B$ is the next unassigned access device to be processed, and FIG. 10 is a table that represents the updated list and sensor counts that result after the assignment of $AD_B$ as a working device. Notably, the sensor count of $AD_C$ has been reduced to one, and the sensor count of $AD_A$ has been reduced to three. FIG. 11 represents the state of the list and sensor counts after assignment of $AD_C$ as a working device, FIG. 12 represents the state of the list and sensor counts after assignment of $AD_H$ as a working device, and FIG. 13 represents the state of the list and sensor counts after assignment of $AD_G$ as a working device.

FIG. 14 represents the state of the list and sensor counts after assignment of $AD_E$ as a detector device. For this situation, $AD_E$ cannot be assigned worker status because two of its senders (namely, $AD_F$ and $AD_G$) have only one sensor. Moreover, since $AD_F$ and $AD_G$ are already assigned as workers, process 650 (FIG. 6B) will perform task 670 and will cause $AD_E$ to be assigned detector status. Notably, the sensor counts of the senders for $AD_E$ (namely, $AD_D$, $AD_F$, and $AD_G$) remain the same (i.e., they are not decremented) because $AD_E$ has been designated as a detector.

FIG. 15 represents the state of the list and sensor counts after analysis of $AD_D$. In this example, $AD_D$ remains unassigned and, therefore, FIG. 15 depicts the column for $AD_D$ in a non-shaded state. For this situation, $AD_D$ remains undecided and unassigned because: (1) two of its senders (namely, $AD_A$ and $AD_E$) have only one sensor; (2) $AD_A$ has not yet been assigned; and (3) $AD_E$ is assigned to be a detector and, therefore, has no influence on the determination of $AD_D$ at this time. Since $AD_D$ remains unassigned, the sensor counts of the other access devices remain unchanged.

FIG. 16 represents the state of the list and sensor counts after assignment of $AD_A$ as a detector device. For this scenario, $AD_A$ is assigned to be a detector because: (1) two of its senders (namely, $AD_B$ and $AD_C$) have only one sensor; and (2) $AD_B$ and $AD_C$ are already designated as workers. Since $AD_D$ remains unassigned at this time, process 400 would perform another iteration of task 410 in an attempt to assign $AD_D$. In this regard, FIG. 17 represents the state of the list and sensor counts after the next analysis of $AD_D$. For this example, $AD_D$ is designated to be a worker because: (1) two of its senders (namely, $AD_A$ and $AD_E$) have only one sensor; and (2) $AD_A$ and $AD_E$ are assigned to be detectors. For these conditions, process 650 performs task 662 (FIG. 6B) and assigns working status to $AD_D$. Accordingly, FIG. 17 represents the final state of the list and sensor counts, and all of the access devices have been assigned to operate as either a detector or a worker. This simple example demonstrates how eight access devices can be assigned after only nine invocations of assignment attempt process 650 (FIG. 6B), and how the automatic assignment methodology results in only two detectors for six workers.

The convergence rate or the assignment efficiency can be roughly gauged by the number of invocations of process 650. For a network with N access devices, if each invocation of process 650 results in a definite assignment, then only N invocations are needed, which translates to an efficiency of 100% and a convergence of N invocations. The instances when process 650 produces no assignment increases the convergence time and lowers the overall efficiency.

The elimination techniques and procedures described above can be likened to a miner panning for gold. For this analogy, the detectors are considered to be the gold nuggets, and the worker devices are considered to be the loose dirt or particulate matter. For a realistic deployment, there will be more workers than detectors (and more dirt than gold nuggets). The elimination technique serves to pan out, filter, or select most of the workers first and leave the detectors on the list of unassigned access devices for a longer period of time. Furthermore, detectors tend to physically reside in the middle of the network, and one detector typically covers more workers for increased efficiency.

In practice, the access devices on the edge of the network boundary have lower sender counts or lower sensor counts than the access devices in the middle of network. By placing the access device in a list sorted by sender count or sensor count, the routine converges quicker because the edge devices are quickly eliminated from consideration as detectors. Therefore, as described above, task 410 starts from the front of list and tries to make an assignment on the selected access device. As soon as an assignment is made and that access device is removed from the list, the process returns to the front of the and repeats, based on the assumption that the previously made assignment would "unlock" the decision on the remaining devices. In other words, the routine does not simply continue to the next access device and make assignment on it. Rather, for this embodiment, the only time that the detector assignment pass of task 410 would reach the end of the list is when there is no decision made in that pass. For as mentioned above, for that scenario the routine proceeds to task 414 and makes a detector assignment to break the cycle.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A self-assignment method for assigning detector and working devices among a plurality of access devices in a wireless network, the method comprising:
 performing wireless data collection with the access devices during an automated calibration period, wherein each of the access devices receives beacons from one or more transmitting access devices;
 recording radio frequency (RF) data associated with beacons received during the wireless data collection; and
 automatically designating at least one of the access devices as a detector device, based upon the recorded RF data;
 wherein for a given access device, the recording step comprises:
 recording a sender count corresponding to the number of access devices from which the given access device received a beacon; and recording a sensor count corresponding to the number of access devices that received a beacon from the given access device; and
 wherein the step of automatically designating comprises:
 advancing through a sorted list in an ordered manner, to analyze candidate access devices in the sorted list; and attempting to designate each candidate access device as either the detector device or a working device while advancing through the sorted list.

2. The method of claim 1, wherein the performing step comprises performing wireless data collection with all of the access devices transmitting at their maximum transmit power levels.

3. The method of claim 1, further comprising preparing the sorted list of access devices that is sorted based on the sender count, wherein the step of automatically designating is influenced by the sorted list.

4. The method of claim 1, wherein the step of automatically designating comprises:
assigning an analyzed candidate access device as the detector device; and
thereafter removing the analyzed candidate access device from the sorted list.

5. The method of claim 1, wherein the step of automatically designating comprises:
assigning an analyzed candidate access device as the working device;
updating the sensor count of access devices that received a beacon from the analyzed candidate access device; and
thereafter removing the analyzed candidate access device from the sorted list.

6. The method of claim 1, further comprising preparing the sorted list of access devices that is sorted based on the sensor count, wherein the step of automatically designating is influenced by the sorted list.

7. The method of claim 1, further comprising automatically designating at least one of the access devices, other than the detector device, as the working device.

8. A self-assignment method for assigning detector and working devices among a plurality of access devices in a wireless network, the method comprising:
performing wireless data collection with the plurality of access devices during an automated calibration period, wherein each of the plurality of access devices transmits beacons during the automated calibration period;
recording a sender count for each of the plurality of access devices, the sender count corresponding to the number of other access devices from which the access device received a beacon;
recording a sensor count for each of the plurality of access device, the sensor count corresponding to the number of other access devices that received a beacon from the access device;
preparing a sorted list of unassigned access devices that is sorted in accordance with increasing sender count or increasing sensor count; and
automatically advancing through the sorted list in an ordered manner while making assignment decisions for candidate unassigned access devices, wherein each assignment decision results in a detector assignment, a worker assignment, or an undecided outcome for the respective candidate unassigned access device.

9. The method of claim 8, further comprising:
selecting a candidate unassigned access device for an assignment decision;
selecting, from the sorted list, a sender device for the candidate unassigned access device, wherein the sender device is an access device from which the candidate unassigned access device received a beacon;
determining that the sender device has a respective sensor count that is equal to one;
determining that the sender device is unassigned; and
generating an undecided outcome for the candidate unassigned access device in response to the determining steps.

10. The method of claim 8, further comprising:
selecting a candidate unassigned access device for an assignment decision;
selecting, from the sorted list, a sender device for the candidate unassigned access device, wherein the sender device is an access device from which the candidate unassigned access device received a beacon;
determining that the sender device has a respective sensor count that is equal to one;
determining that the sender device is assigned as a worker; and
assigning the candidate unassigned access device as a detector in response to the determining steps.

11. The method of claim 10, further comprising removing the candidate unassigned access device from the sorted list, the removing step being performed in response to the assigning step.

12. The method of claim 8, further comprising:
selecting a candidate unassigned access device for an assignment decision;
identifying, from the sorted list, all sender devices for the candidate unassigned access device, wherein a sender device is an access device from which the candidate unassigned access device received a beacon;
determining that each sender device for the candidate unassigned access device has a respective sensor count that is greater than one; and
assigning the candidate unassigned access device as a worker in response to the determining step.

13. The method of claim 12, further comprising decrementing the sensor count for all of the sender devices for the candidate unassigned access device, the decrementing step being performed in response to the assigning step.

14. The method of claim 12, further comprising removing the candidate unassigned access device from the sorted list, the removing step being performed in response to the assigning step.

* * * * *